Feb. 19, 1935. M. N. DAVIS 1,991,599
PAPER INSPECTION PROCESS AND APPARATUS
Filed Dec. 1, 1933
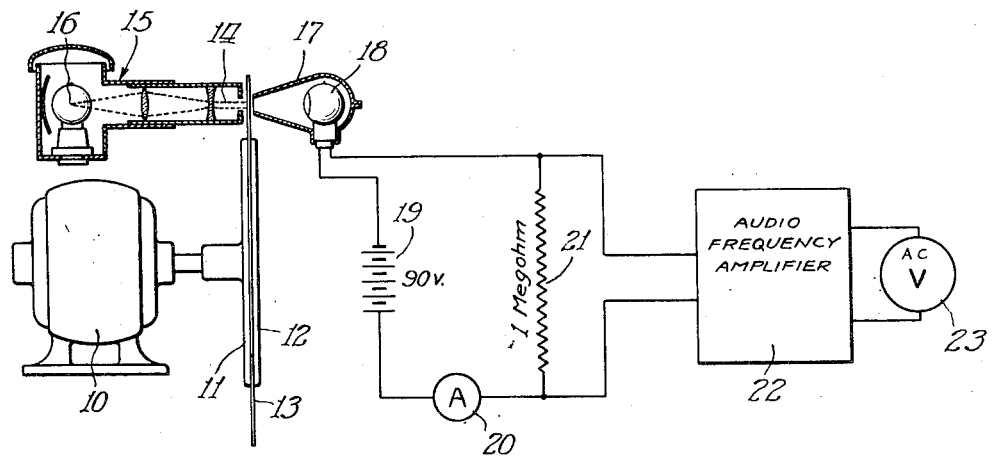
Inventor
Myrl N. Davis
By: Fisher, Clapp, Soans
 Pond Attys.

Patented Feb. 19, 1935

1,991,599

UNITED STATES PATENT OFFICE 1,991,599

PAPER INSPECTION PROCESS AND APPARATUS

Myrl N. Davis, Appleton, Wis., assignor to Paper Patents Company, Neenah, Wis., a corporation of Wisconsin Application December 1, 1933, Serial No. 700,557

11 Claims. (Cl. 88—14)

The invention relates to improvements in paper inspection process and apparatus, and has particular application in connection with the examination, comparison, and grading of papers in respect of that quality known in the paper-making trade as "formation".

The formation of a sheet is designated as being uniform, when the fibers are evenly distributed throughout the area of the sheet as distinguished from the formation of a so-called "wild" sheet in which the fibers are irregularly distributed in the form of patches or blotches of greater concentration so that the intermediate areas contain less fiber, the sheet presenting a more or less mottled or patchy appearance. The formation of different sheets of paper is usually examined and compared by holding the sheet up to a source of diffused light and noting visually the variations in brightness of the transmitted light from point to point in the sheet.

The difference in brightness observed under the above conditions are, of course, governed by differences in the transmission of diffuse light from point to point. According to Fechner's law, the contrast between two points of differing brightness $B_1$ and $B_2$ is proportional to the difference in brightness and inversely proportional to the mean brightness $\bar{B}$ of the sheet, i. e.

$$\text{Contrast} = \frac{B_1 - B_2}{\bar{B}}.$$

The brightness of any point is proportional to the intensity $I_0$ of the incident light and to the transmission $T$ at that point, or $$B = T\, I_0.$$

We thus have $$\text{Contrast} = \frac{T_1 - T_2}{\bar{T}}.$$

If the transmissions of a large number of points distributed over the surface of the sheet were measured, it would be possible to compute the mean transmission and the mean deviation of the individual transmissions from the average. The ratio of mean deviation in transmission to mean transmission can be called the "mean contrast" and will be a numerical measure of the uniformity of formation of the sheet in the sense that a perfectly formed sheet will yield a value of zero for the "mean contrast", whereas a poorly formed sheet will yield a value greater than zero, the value increasing as the variations in formation increase.

The principal object of the present invention is to measure and compute the mean contrast ratio in the sheet, although the invention may also be employed as a means for directly comparing the ratio characteristics of the different sheets without the necessity of any particular mathematical computation.

In applying the invention a photo-electric inspection method is employed. It is obvious that when a translucent sheet is interposed between a light source and a suitable light-sensitive cell properly connected in a suitable circuit, the current in the photo-electric circuit will vary in accordance with the amount of light passing through the sheet and received by the light-sensitive cell. If the area of the sheet thus inspected by the photo-electric cell is sufficiently small, the current of the photo-electric circuit at the particular spot or point which is being inspected, as compared with the current flowing when a different spot is inspected, will represent, in inverse ratio, the degree of fiber concentration at the compared inspection point. Theoretically, the formation of a sheet could be inspected by thus taking a number of photo-electric readings at different points on the sheet and thus, in some measure, arriving at a more or less accurate measurement by such direct comparison method.

In order to avoid the laborious task of taking a large number of different photo-inspection readings, I have devised a method of integration which vastly reduces the time required as compared with separate individual readings. This preferred method contemplates a continuous movement of the inspection area point or spot over the surface of the paper specimen so as to produce, in the current of the photo-electric circuit, variations corresponding to the variations in the formation as the inspection spot moves over the surface of the sheet. These electrical variations are then integrated so as to show the total amount of variation during the time that the inspection spot travels over the sheet, as compared with the average amount of light transmitted by the sheet, i. e. the average value of the cell current, so as to furnish a basis for the accurate and expeditious determination of the mean contrast ratio of the specimen.

In order to obtain currents of sufficient magnitude to be measured by ordinary existing available instruments, the relatively minute variations in the photo-electric cell current are preferably amplified. The type of amplification apparatus selected will, of course, depend upon the frequency of the current variations. As a practical matter, I find it convenient to effect movement of the photo-electric inspection point across the sheet at such a speed that the variations have frequencies which come within the effective range of an audio-frequency transformer or amplifier.

Various methods and types of apparatus may be employed for effecting proper travel of the photo-electric inspection spot. Among other methods may be mentioned the following:

The sample or specimen may be moved and propelled past or between a stationary light source and associated photo-electric cell. The entire area of the paper may be illuminated, in which case the photo-electric cell is screened except as to a very small portion of the illuminated surface, or the illumination of the sheet may be confined to an area of the same magnitude as that of the inspection area. If desired, the paper may be held stationary while effecting movement of the light source or beam, or of the photo-electric cell, or both. However, as a practical matter, it is found to be more convenient to move the specimen while keeping the light source and the cell and other associated apparatus relatively stationary. Also, for the same reason of practical convenience, the specimen is preferably moved continuously, and in a closed path, as by rotation, so that a comparatively small sample of paper can be used to furnish a steady reading when the specimen is being moved at the required speed to suit the conditions of the set-up.

In the drawing accompanying this application the figure represents in somewhat diagrammatic form, one form of apparatus by which the herein described process may be successfully practiced.

Referring to the said drawing, 10 represents an electric motor preferably of the slow-speed synchronous type, upon the shaft of which is mounted a base plate 11 and clamping ring or disk 12, between which plate and disk there is secured the circular sample 13 which is to be subjected to the test. The free edge of the sample extends beyond the edge of the base plate 11 a sufficient distance, say about two inches, so that it may be subjected to a concentrated parallel beam of light 14 of a light projecting arrangement designated as a whole, by the numeral 15. The lamp 16 should preferably be supplied from a very constant source of electrical energy so that there shall be no variation in the intensity of the light beam 14. The filament of the lamp 16 is sufficiently concentrated and the lens system of the projector is so arranged that the beam of light 14 will illuminate an area or spot on the sample 13, in the neighborhood of one-eighth inch in diameter.

On the opposite side of the spinning sample 13 there is arranged in a suitable housing 17, a photo-electric cell 18. This cell is preferably of the caesium-on-silver vacuum type and connected in series with a high potential battery 19 and a micro-ammeter 20. The circuit is bridged with a high resistance 21 and the output of the photo-electric system is measured by an audio-frequency amplifier 22; a good three tube set, which has an amplification ratio of not less than a few hundred, will be adequate for the average condition.

The output of the audio-frequency amplifier is measured by an A. C. volt meter 23. Such A. C. volt meter, which contains proper arrangements for rectifying the supply current, serves to integrate the variable and alternating current which is received from the audio-frequency amplifier. Under average conditions, an A. C. volt meter having a two volt range may be conveniently employed.

In view of the drawing and the above description, the invention requires little further explanation. With the sample in place, the motor brought up to speed, and the light turned on, steady readings of the meters 20 and 23 are taken. No other manipulations or readings of the various instruments are required.

The sample on test may be compared with samples of other classes of paper or papers of the same class, which have been subjected to a similar test and their characteristics properly recorded, or if desired, the mean contrast ratio can be calculated as follows:

With the sample in place, the motor running and the light source turned on, the reading of the output meter is roughly proportional to the mean variation in transmission while that of the microammeter is proportional to the mean transmission itself. If the input voltage $E_i$ to the amplifier and the output voltage $E_o$ of the amplifier are related by the known relationship (found by calibration of the amplifier) $E_i = f(E_o)$, we may write $$\text{Mean contrast} = \frac{\overline{\Delta T}}{\overline{T}} = \frac{\overline{\Delta i}R}{\overline{i}R} = \frac{E_i}{\overline{i}R} = \frac{f(E_o)}{\overline{i}R}$$

Where $\overline{\Delta T}$ = Mean variation in transmission
$\overline{T}$ = Transmission
$R$ = Resistance of grid leak in photocell circuit
$\overline{\Delta i}$ = Mean variation in photo-electric current
$\overline{i}$ = Mean photo-electric current.

Using this system, variations in "mean contrast" from .005 to .015 have been observed in M. F. book papers. Visual observation indicates that if two samples show different values of mean contrast the sample showing the lower value has the better formation.

I claim as my invention:

1. The improvement in the art of determining variations in the formation of a paper sheet, which consists in illuminating the sheet, photo-electrically inspecting a relatively small area of said sheet when said area is so illuminated, while effecting movement of the sheet relative to the inspection area, and automatically integrating the variations in the photo-electric circuit caused by the variations in the formation.

2. The improvement in the art of determining variations in the formation of a paper sheet, which consists in illuminating the sheet, photo-electrically inspecting a relatively small area of said sheet when said area is so illuminated, while effecting movement of the sheet relative to the inspection area, and amplifying and automatically integrating the variations in the photo-electric circuit caused by the variations in the formation.

3. The improvement in the art of determining variations in the formation of a paper sheet, which consists in illuminating a relatively small area of the sheet, photo-electrically inspecting said area of illumination, while effecting movement of the sheet relative to the inspection area and automatically integrating the variations in the photo-electric circuit caused by the variations in the formation.

4. The improvement in the art of determining variations in the formation of a paper sheet, which consists in illuminating the sheet, photo-electrically inspecting the translucence of a relatively small area of said sheet when said area is so illuminated, while effecting movement of the sheet relative to the inspection area, and automatically integrating the variations in the photo-electric circuit caused by the variations in the formation.

5. The improvement in the art of determining variations in the formation of a paper sheet, which consists in illuminating the sheet, photo-electrically inspecting the translucence of a relatively small area of said sheet when said area is so illuminated, while effecting movement of the sheet relative to the inspection area, and amplifying and automatically integrating the variations in the photo-electric circuit caused by the variations in the formation.

6. The improvement in the art of determining variations in the formation of a paper sheet, which consists in illuminating a relatively small area of the sheet, photo-electrically inspecting the translucence of said area of illumination, while effecting movement of the sheet relative to the inspection area, and automatically integrating the variations in the photo-electric circuit caused by the variations in the formation.

7. Apparatus for determining variations in the formation of a sheet, comprising a light source for illuminating the specimen, a photo-electric cell arranged to inspect a relatively small area of the specimen as so illuminated, means for effecting a continuous movement of the specimen relative to the inspection area while maintaining said inspection area constantly and uniformly illuminated, and means for integrating the variations in the cell current.

8. Apparatus for determining variations in the formation of a sheet, comprising a light source for illuminating the specimen, a photo-electric cell arranged to inspect a relatively small area of the specimen as so illuminated, means for rotating the specimen while maintaining said inspection area constantly and uniformly illuminated, and means for integrating the variations in the cell current.

9. Apparatus for determining variations in the formation of a sheet, comprising means for rotating the sheet in its own plane while leaving a circumferential and annular portion of said sheet unsupported, a light source on one side of said annular portion, and a photo-electric cell on the other side of said annular portion adapted to receive light transmitted through the sheet, and means for integrating variations in the cell current.

10. Apparatus for determining variations in the formation of a sheet, comprising means for uniformly and constantly spinning the sheet in its own plane while leaving a circumferential and annular portion of said sheet unsupported, a light source on one side of said annular portion, and a photo-electric cell on the other side of said annular portion adapted to receive light transmitted through the sheet, and means for integrating variations in the cell current.

11. The improvement in the art of determining variations in the formation of a paper sheet, which consists in illuminating the sheet, photo-electrically inspecting a relatively small area of said sheet when said area is so illuminated, while effecting movement of the sheet relative to the inspection area, and electrically integrating the variations in the photo-electric circuit caused by the variations in the formation.

MYRL N. DAVIS.